United States Patent Office 3,535,339
Patented Oct. 20, 1970

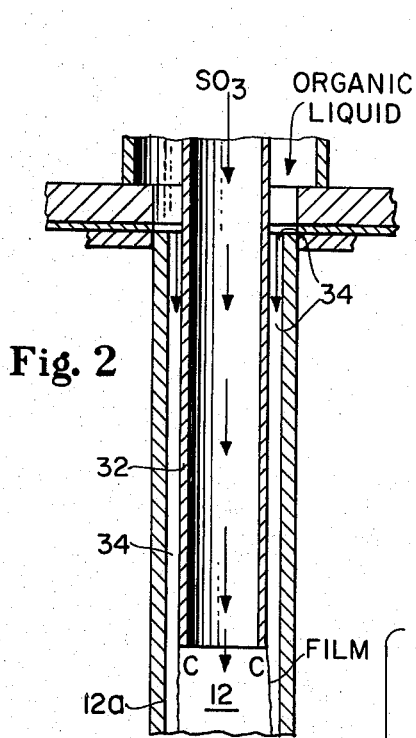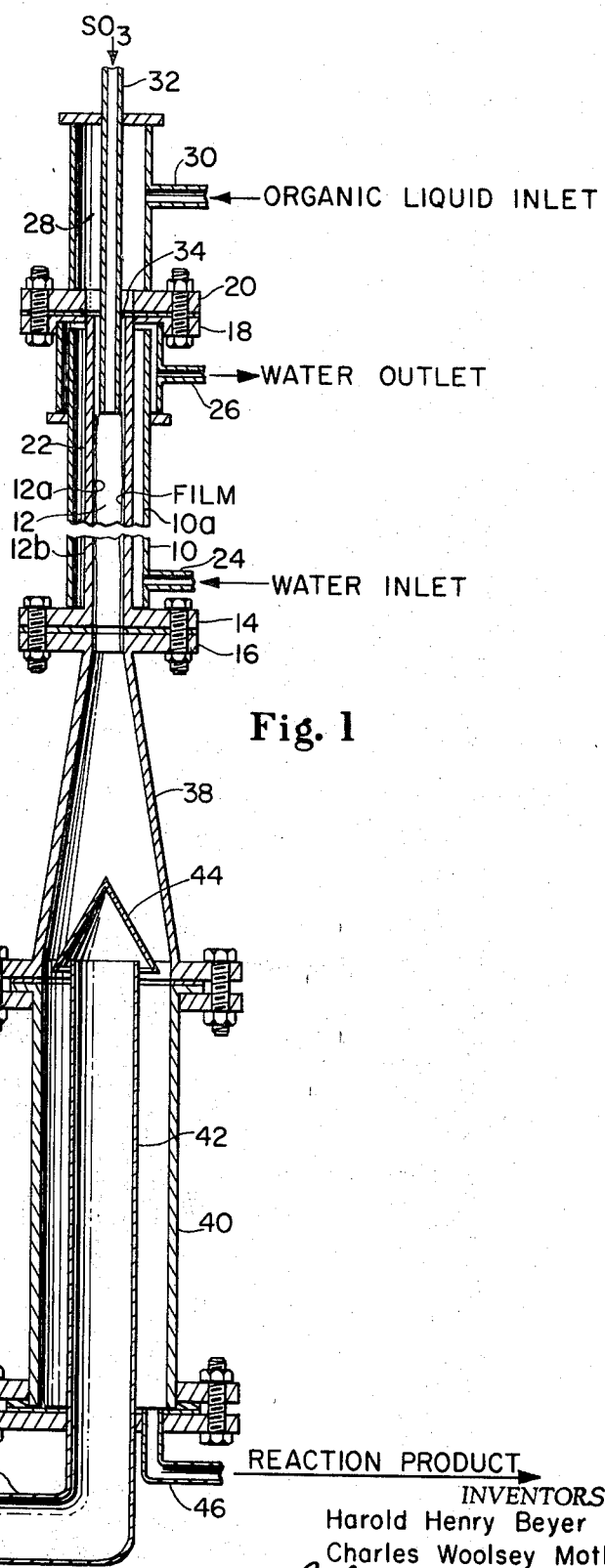

3,535,339
PROCESS AND APPARATUS FOR THE CONTINUOUS REACTION OF ORGANIC COMPOUNDS WITH UNDILUTED SULFUR TRIOXIDE
Harold Henry Beyer, Springfield Township, Hamilton County, and Charles Woolsey Motl, Wyoming, Ohio, assignors to The Procter & Gamble Company, Cincinnati, Ohio, a corporation of Ohio
Filed Dec. 17, 1965, Ser. No. 514,468
Int. Cl. C07c 143/16, 143/02
U.S. Cl. 260—327          1 Claim

ABSTRACT OF THE DISCLOSURE

A process and apparatus wherein gaseous sulfur trioxide is reacted under conditions of subatmospheric pressure with a thin flowing film of liquid organic compound. In the process high yields are achieved employing undilute sulfur trioxide despite the fact that there is no dilution gas to act as a turbulent film promoter. In the apparatus, the subatmospheric pressure source is in communication with a product-excess gas separator section and draws out the excess gas while a coacting baffle minimizes the amount of product drawn out with the excess gas.

---

This invention relates to a process and apparatus for the continuous sulfation and sulfonation of organic compounds with sulfur trioxide. More particularly, this invention relates to a process and apparatus wherein gaseous sulfur trioxide is reacted under conditions of subatmospheric pressure with a thin flowing film of liquid organic sulfatable or sulfonatable compound. In this specification and claims the term "sulfonation" (and the related derivatives thereof such as sulfonating, sulfonate, sulfonic, sulfonated and the like) is used hereinafter sometimes in its generic sense as applying both to true sulfonation and to sulfation, and sometimes in its specific sense limited to true sulfonation. Where the context in which the term "sulfonation" or related derivative is used does not require the specific sense, it is to be construed generically.

Sulfur trioxide is a preferred sulfonating agent because it reacts in substantially stoichiometric quantities, and its reactions do not produce by-products which may necessitate further processing for separation from product. For example, sulfur trioxide is preferred over sulfuric acid or oleum sulfonating agents which ordinarily are used in stoichiometric excess thereby providing dilute sulfuric acid by-product which is sometimes separated from product before further processing or which requires an agent such as sodium hydroxide for its neutralization. Chlorosulfonic acid sulfonating agents upon reaction produce hydrochloric acid which ordinarily requires further processing for its disposal.

While sulfur trioxide is an effective sulfonating agent, it is so highly reactive and its reactions are so exothermic that charring of the reaction mixture often results, accompanied by contamination and discoloration of product. A mixture of gaseous sulfur trioxide diluted with an inert gas is widely recognized as an effective sulfonating agent for the sulfonation of liquid organic compounds, whereby the diluent reduces the effective concentration of the sulfur trioxide, thereby reducing charring. The use of gaseous diluents, however, particularly in higher proportions, requires relatively elaborate equipment for inert gas supply and exhaust gas discharge. For example, when air is used as a diluent, air drying facilities, air blowers, heat exchangers and flow control devices are required for the air supply system. Moreover, gas scrubbing equipment is required to remove residual sulfur trioxide and vaporized organic pollutants from the exhaust air before this air is released to the atmosphere.

Such dilute sulfur trioxide has been employed as a sulfonating agent in various film sulfonation processes. In these processes, gaseous dilute sulfur trioxide is reacted with a thin flowing film of liquid organic sulfonatable compound. The diluent gas in addition to reducing the effective concentration of the sulfur trioxide induces turbulence in the film in order to promote rapid reaction and rapid transfer of the heat generated to a coolant jacket.

It is an object of this invetnion to provide a novel film sulfonation process and apparatus employing gaseous sulfur trioxide.

It is a further object of this invention to provide a film sulfonation process which is economical and readily practiced.

It is a further object of this invention to provide film sulfonation process and apparatus for the reaction of gaseous sulfur trioxide with liquid organic sulfonatable compounds whereby charring is eliminated or significantly reduced thereby providing flexibility in producing product.

It is a further object of this invention to provide film sulfonation process and apparatus for the reaction of gaseous sulfur trioxide with liquid organic sulfonatable compounds wherein diluent gas is not necessarily employed as a turbulent film promoter.

Another object of this invention in one of its preferred embodiments is to provide a film sulfonation process and apparatus for the reaction of gaseous sulfur trioxide with liquid organic sulfonatable compounds which eliminates or reduces the equipment and effort to supply inert gaseous diluent.

Still another object of this invention in one of its preferred embodiments is to provide a film sulfonation process for the reaction of undilute gaseous sulfur trioxide with liquid organic sulfonatable compounds to produce product.

Briefly stated, in accordance with one embodiment of this invention, there is provided an apparatus comprising a reaction chamber; a means for introducing gaseous sulfur trioxide into the chamber, for example, a gas inlet pipe or nozzle; an organic liquid supply chamber or reservoir which is in film-forming relation with the reaction chamber and gas introduction means to supply liquid organic sulfonatable compound to the reaction chamber in the form of a thin film flowing along the reaction chamber wall; cooling means for the reaction chamber to control the temperature of reaction; means for providing specified conditions of subatmospheric pressure in the reaction chamber to control the concentration of sulfur trioxide; and means for recovering the reaction product which results. In the reaction chamber which defines a reaction zone the gaseous sulfur trioxide which is supplied by the gas introduction means reacts with the thin film of liquid organic sulfonatable compound flowing over a specified length of reaction chamber wall, under controlled temperature conditions and with the reaction chamber maintained at subatmospheric pressure. The product is recovered for further processing, for example, neutralization to provide detergent paste.

While the specification concludes with claims particularly pointing out and distinctly claiming the subject matter of the present invention, it is believed that the invention will be better understood from the following description taken in connection with the accompanying drawing.

FIG. 1 is a front elevational view, partly in section and partly broken away, of an apparatus within the scope of this invention, which is employed in the examples.

FIG. 2 is a front elevational view, partly in section and partly broken away, of an upper portion of the apparatus of FIG. 1, particularly depicting organic liquid film formation and initial sulfur trioxide-organic liquid contact.

Referring to the two figures of the drawing, there is shown a generally upright cylindrical housing 10 having an inner surface 10a. The housing 10 contains in concentric relation a cylindrical reaction chamber 12 having a side wall with inner surface 12a and outer surface 12b and which communicates at the top and bottom with other elements of this apparatus to be described hereinafter. The reaction chamber 12 generally ranges in length from 6 feet to 30 feet with a length ranging from 11 feet to 24 feet preferred. Its diameter is not critical but ordinarily ranges from 0.5 to 50 inches. The housing 10 and the reaction chamber 12 as well as all other elements of this apparatus described hereinafter which may contact the corrosive sulfonic acid formed herein are constructed of stainless steel or glass or other substantially rigid acid-resistant construction materials.

The side wall of reaction chamber 12 is employed herein as a heat exchange surface. This side wall together with the inner surface 10a of housing 10 and supporting flange members 14 and 16 and spacing flange members 18 and 20 define a water circulation chamber 22. The housing 10 is provided with water inlet line 24 and water outlet line 26 for circulating cooling water through water circulation chamber 22 between housing inner surface 10a and reaction chamber side wall outer surface 12b to effect heat exchange and more particularly cooling through the side wall of reaction chamber 12.

A cylindrical organic liquid supply chamber or reservoir 28 having organic liquid inlet line 30 is above and in communication with the reaction chamber 12 and is positioned above the reaction chamber by spacing flanges 18 and 20. In concentric and film-forming relation with the side wall of reaction chamber 12 and with reservoir 28 is gas inlet pipe 32 through which gaseous sulfur trioxide is supplied into reaction chamber 12. This gas inlet pipe is in communication with a source of sulfur trioxide gas (not shown) such as a sulfur trioxide vaporizer.

A lower portion of the outer surface of gas inlet pipe 32 and an upper portion of the inner surface 12a of the side wall of reaction chamber 12 are juxtaposed thereby forming an annular passageway or channel 34 through which organic liquid passes from reservoir 28 into reaction chamber 12 and whereby a thin film of organic liquid flowing along surface 12a is produced. The actual film thickness in reaction chamber 12 is a function of the annular passageway width, the gas and liquid velocities and of other variables. Ordinarily the passageway width does not exceed the desired film thickness. Generally, this passageway width ranges from about 0.005 inch to about 0.1 inch. For alkyl benzene, a passageway width ranging from about 0.005 inch to about 0.05 inch is preferred. Generally, a passageway length ranging from about 0.5 inch to about 5 inches or more is employed to ensure film formation.

A separator section 36 is below and in communication with reaction chamber 12. It comprises an upper open-ended frusto-conical portion 38 and a lower cylindrical portion 40. Extending upward into cylindrical portion 40 is line 42 which is in communication with a source which maintains the reaction chamber 12 specified subatmospheric pressure. This source (not shown) of subatmospheric pressure throughout the reaction chamber can be, for example, a steam ejector or vacuum pump or other source well known in the subatmospheric pressure art. Besides providing subatmospheric pressure in reaction chamber 12, line 42 also serves as an exhaust gas outlet. Overlying line 42 is conical baffle 44 which minimizes the amount of liquid leaving the system through this line. At the lower end of the cylindrical portion 40 is product recovery line 46 for recovering reaction product for further processing. Reaction product can be recovered, for example, by pumping to storage or to neutralization processing equipment. Line 42 should extend above the level of the reaction product collecting at the bottom of cylindrical portion 40 so that none of the collected reaction product exits by way of this line.

The elements of this apparatus are secured together by welding, threads or other means well known in the art.

Besides the above described preferred apparatus, various other film sulfonation apparatus are within the scope of the present invention when adapted for use with the conditions of subatmospheric pressure described hereinafter which are essential to the present invention. Thus, many variations are possible in the above apparatus within the scope of the present invention. For example, film-forming and distributing devices other than vertically-oriented annular passageway 34 can be employed herein. For example, the organic liquid can be fed into the reaction chamber through a horizontally-oriented thin slot, or the organic liquid can be fed into the reaction chamber through a porous metal membrane in the reaction chamber wall. Moreover, the cross-section of the reaction chamber can be rectangular, elliptical, annular or other continuous configuration. Moreover, an array of reaction chambers can be used, such as a plurality of tubes, e.g., a bundle of tubes enclosed in a single unit similar to a shell-and-tube heat exchanger. Furthermore, the orientation of the reaction chamber need not necessarily be generally upright or vertical. Moreover, the above apparatus can be adapted so that the flow of organic compound and the flow of sulfur trioxide are countercurrent instead of cocurrent as described above.

With the apparatus depicted in the figures herein, gaseous sulfur trioxide and liquid organic sulfonatable compound are reacted in reaction chamber 12. More particularly, this reaction occurs in a reaction zone starting at the initial point of contact between the sulfur trioxide and liquid organic sulfonatable compound and extending in a downward direction along the side wall of reaction chamber 12. This initial point of contact is denoted C in FIG. 2 herein. This reaction zone is defined by supporting and confining heat exchange surface 12a of the wall of chamber 12.

The gaseous sulfur trioxide is fed into gas inlet pipe 32 by means of suitable piping connections, for example, from a sulfur trioxide vaporizer. From gas inlet pipe 32 the sulfur trioxide is continuously introduced into the reaction zone. The gas rate is controlled by appropriate means, for example, a rotameter.

Liquid organic sulfonatable compound is fed, for example, by pumping and suitable piping, through inlet line 30 into reservoir 28. The organic compound flows from reservoir 28 and is continuously fed into the reaction zone wherein it is evenly distributed on surface 12a as a thin flowing film. This thin flowing film is formed by means of annular passageway 34. The specific stock rate, that is, the rate in pounds per hour divided by the perimeter of the reaction zone in inches, of organic compound is determined by the feed rate of organic compound to the reservoir which is ordinarily kept full.

In the reaction zone, the gaseous sulfur trioxide contacts the flowing film of organic compound thereby causing sulfonation reaction and producing sulfonated product. Ordinarily, contact is maintained over a length of reaction zone such that reaction is substantially complete, that is, greater than 85%. The reaction herein is essentially instantaneous, the residence time in the reactor being a function of organic compound specific stock rate and reaction chamber or reaction zone length.

Diluent gas is not necessarily employed herein as a turbulent film promoter. Essentially the only film turbulence necessarily present is that produced inherently by the organic compound flow under the conditions described herein.

This reaction is highly exothermic. The exothermic heat of reaction is in part removed and the temperature controlled within hereinafter specified limits by heat transfer through the wall of reaction chamber 12. This heat transfer and cooling is effected by circulating cooling water through chamber 22. For example, cooling water, e.g., at 85% F., can be pumped by conventional pumping means into water inlet line 24 and from there into chamber 22 wherein it provides cooling and temperature control of the reaction zone and exits via water outlet line 26.

The pressure at which the above described sulfonation reaction is conducted is a key to the present invention. It is essential to the process of this invention that subatmospheric pressure as hereinafter specified by maintained in the reaction zone. In the depicted apparatus, a source of subatmospheric pressure, e.g., a steam ejector, is connected to line 42 to provide the pressure essential herein. This source of subatmospheric pressure also provides for introduction of the gaseous sulfur trioxide from gas inlet pipe 32 at subatmospheric pressure. The subatmospheric pressure means furthermore causes any excess gas to be withdrawn from the system through line 42.

The reaction product emerging from the bottom of reaction chamber 12 is then collected through line 46 for further processing such as neutralization.

Turning now to the reactants herein, any suitable source of gaseous sulfur trioxide can be employed. For example, gaseous sulfur trioxide can be provided by a stabilized liquid sulfur trioxide having more than 99% available $SO_3$ content, and offered for sale under the trade name "sulfan." If this stabilized liquid sulfur trixoide is desired to be employed, it must be transformed into gaseous form for use herein, for example by pumping with a metering pump into a conventional sulfur trioxide vaporizer wherein the liquid is vaporized. The vaporized sulfur trioxide in undilute form can then be made to flow through suitable piping into the gas inlet pipe.

As previously pointed out above, the use of undilute sulfur trioxide is very advantageous since the use of a gaseous diluent ordinarily requires relatively elaborate gas supply and discharge equipment. Thus, undilute sulfur trioxide is preferably used herein. However, dilute sulfur trioxide can also be used herein, thus providing added flexibility in processing. Even if dilute sulfur trioxide is employed herein, the ordinary gaseous diluent requirement can be substantially reduced, e.g., by employing volume ratios of inert dilution gas to sulfur trioxide of less than about 5:1 whereas conventional processes require ratios of greater than 5:1 and even as high as 50:1.

If it is desired to employ dilute gaseous sulfur trioxide herein, the diluting gas can be, for example, air, nitrogen, carbon dioxide, sulfur dioxide or any other gas which is inert in the reaction medium. Air is a preferred diluting gas because of its availability and low cost. The diluting gas can be simply mixed with the gaseous sulfur trioxide from the vaporizer or other source. Dilute sulfur trioxide can also be obtained in the form of converter gas from the contact sulfuric acid process. Such converter gas is usually an air-sulfur trioxide mixture containing about 10% sulfur trioxide, by volume.

As far as the organic reactant is concerned, any organic compound which is liquid under the temperature and pressure conditions of the reaction herein and which is sulfonatable can be used in the process of this invention. Sulfonatable organic compounds which are normally solid under reaction conditions can also be employed herein provided they are dissolved in an inert solvent which is liquid under reaction conditions.

According to Schwartz and Perry, "Surface Active Agents," Interscience, New York, 1949, sulfonatable compounds include, for example, compounds having an alcoholic hydroxyl, compounds having an olefinic linkage and compounds having an aromatic nucleus.

Preferred organic sulfonatable compounds within the above described classes and used in the process of this invention include, for example, alkyl aryl hydrocarbons, higher olefins, higher fatty alcohols, condensation products of higher fatty alcohols and ethylene oxide, condensation products of alkyl phenols and ethylene oxide, and higher fatty acids.

Sulfonatable alkyl aromatic compounds include the mononuclear (e.g., benzene and toluene) or polynuclear (e.g., naphthalene and anthracene) organic compounds. More particularly included as examples are the higher alkyl aryl hydrocarbons having an alkyl constituent containing 9 to 18 carbon atoms, for example, those alkyl aryl hydrocarbons derived from benzene, toluene and naphthalene. The alkyl substituent can be straight (linear) or branched chain in structure and comprises such groups as decyl, dodecyl, tridecyl, pentadecyl, octadecyl, mixed chain alkyls, e.g., those derived from kerosene, fatty materials, polymers of lower olefins, cracked wax olefins and the like. Preferred examples of this class are the higher alkyl benzenes wherein the alkyl group is about 12 to 15 carbon atoms, e.g., tetrapropylene and pentapropylene benzene. The linear alkyl benzenes are especially preferred.

Also suitable are long chain olefins containing 8 to 24 carbon atoms. These olefins can be straight or branched chain and contain one or more olefinic linkages. The olefinic linkages can be found at any position. For example, random olefins wherein the olefinic linkages are randomly distributed over the chain length are suitably employed herein. Preferred olefins are olefins with the olefinic linkage at the alpha position such as, for example, 1-dodecene, 1-tridecene, or 1-octadecene.

Sulfonatable higher fatty alcohols include straight and branched chain fatty alcohols including those from natural sources, e.g., coconut oil and tallow, and those from synthetic sources, e.g., the "oxo" process. The alcohols preferably range in chain length from 8 to 24 carbon atoms. Specific examples are dodecanol, hexadecanol, octadecanol and the like. Preferred alcohols are those derived from coconut oil. Also suitable are the ethylene oxide condensates of such fatty alcohols, e.g., condensates resulting from reaction with 1 to 10 moles of ethylene oxide.

Also suitable are condensation products of alkyl phenols with ethylene oxide, e.g., 1 to 10 moles. Preferred alkyl phenols are those wherein the alkyl ranges from about 8 to about 18 carbon atoms, e.g., nonyl phenol and tridecyl phenol, containing 8 moles of ethylene oxide.

Sulfonatable higher fatty acids are exemplified by those ranging from about 10 to about 20 carbon atoms in chain length which are preferably from natural sources. Specific examples are the individual acids, e.g., lauric, palmitic and stearic acids and the mixtures of acids derived from coconut oil and tallow.

The sulfates or sulfonates of the above organic compounds are formed by the process of this invention, particularly in their neutralized form, are outstandingly useful as detergents, emulsifiers and surface active agents, particularly in the washing of textiles and other fabrics.

Examples of sulfonatable lower alkyl aryl hydrocarbons are toluene and xylene. The sulfonates of toluene and xylene are useful hydrotroping agents.

The sulfonated products resulting from the process of this invention are most useful if they are neutralized after reaction by well known means with any of the usual reagents, e.g., sodium, potassium, or ammonium hydroxide, sodium or potassium carbonate, triethanolamine and the like.

Turning now to the processing conditions herein, the specific stock rate of organic compound depends upon the particular organic compound used but in general ranges from about 2 to about 75 pounds per hour per inch. In the case of dodecyl benzene, the specific stock rate ordinarily ranges from about 10 to about 50 pounds per hour per inch. The film thickness of organic compound ordinarily ranges from about 0.005 inch to about 0.1 inch and is preferably not more than about 0.05 inch.

The gaseous sulfur trioxide is preferably used in stoichiometric amounts relative to the organic compound ample, with hydrogen peroxide, to provide detergent material with commercially acceptable color.

TABLE

| | Example I | Example II | Example III | Example IV |
|---|---|---|---|---|
| Organic reactant | Tetrapropylene benzene. | Tetrapropylene benzene. | Tetrapropylene benzene. | 1-hexadecene. |
| Sulfonating agent | Undilute SO₃ | Undilute SO₃ | Undilute SO₃ | Undilute SO₃. |
| Specific stock rate of organic reactant (lbs./hr./in.) | 11.6 | 19.4 | 11.6 | 5. |
| Molar ratio (SO₃/organic reactant) | 1.04 | 1.04 | 0.97 | 1.05. |
| Film thickness | 0.007 | 0.007 | 0.007 | 0.007. |
| Reaction temperature (° F.) | 150 | 150 | 150 | 150. |
| Cooling water temperature (° F.) | 85 | 85 | 85 | 85. |
| Reaction zone pressure (mm.Hg) | 13 | 18 | 11 | 10. |
| Completeness | 96.8 | 92.9 | 88 | 95. | to be sulfonated although up to about 3 to 10% or more excess of this amount can advantageously be used.

The temperature of the sulfonation reaction with the preferred organic sulfonatable compounds hereinbefore described is preferably maintained in the range of about 32° F. to about 250° F., the maximum temperature being set in order to avoid charring or other degradation resulting from the high temperatures of the exothermic reaction. Preferred temperature ranges depend upon the particular organic feedstock employed. A preferred temperature rang for alkyl benzene and higher alpha-olefin sulfonation is 110° F. to 160° F.

As previously mentioned, the pressure at which the sulfonation reaction is conducted is a key to the present invention. It is essential for the process of this invention that subatmospheric pressure be maintained in the reaction zone to provide a partial pressure of sulfur trioxide ranging from about 1 mm. Hg to about 500 mm. Hg and preferably within the range of 6 mm. Hg to 60 mm. Hg. The pressures given herein are the inlet gas pressures measured as the gas enters the reaction zone and are substantially the same as the pressures in the reaction zone although slightly higher due to the pressure drop of the gas in passing through this zone. The partial pressure of the sulfur trioxide ($P_p$) used in the sulfonation reaction is equal to the total pressure ($P_t$) of the system times the molar ratio of sulfur trioxide plus inert gas:

$$P_p = P_t \times \frac{\text{Moles SO}_3}{\text{Moles inert gas} + \text{Moles SO}_3}$$

As can be seen from this equation, reduction in the total pressure of the reaction zone will permit a reduction or elimination in the molar quantity of diluent gas while maintaining the same partial pressure of sulfur trioxide which is necessary to achieve the desired reaction.

If undilute sulfur trioxide is employed herein subatmospheric pressures less than about 1 mm. Hg are impractical necessitating relatively expensive equipment; subatmospheric pressures greater than 500 mm. Hg provide charred or dark reaction product.

The specific examples in the following table are merely illustrative of the present invention and are not to be construed in any way as limiting its scope. In these examples, the apparatus depicted in the two figures herein is employed with an annular passageway width of 0.008 inch, an annular passageway length of 1¹³⁄₁₆ inches, a gas inlet pipe inside diameter of 0.622 inch, a reaction chamber inside diameter of 0.803 inch and a reaction chamber length of 11 feet.

In these examples, the film thicknesses are estimated average values over the length of the reaction zone. Undilute sulfur trioxide is employed as the sulfonating agent, and thus, diluent gas is not employed as a turbulent film promoter. The only film turbulence present is that inherently produced by organic compound flow. The reaction product which is produced is neutralized to form a highly effective detergent material. The neutralized product produces detergent material with commercially acceptable color; or the neutralized product can be bleached with conventional bleaching methods, for example, with hydrogen peroxide, to provide detergent material with commercially acceptable color.

Similar results are also obtainable in the above examples if other organic compounds are substituted for the tetrapropylene benzene and 1-hexadecene therein. For instance, high completeness is also achieved when higher fatty alcohols such as dodecanol, ethoxylated fatty alcohols such as octadecanol ethoxylated with 5 moles of ethylene oxide, ethoxylated alkyl phenols such as nonyl phenol ethoxylated with 8 moles of ethylene oxide or higher fatty acids such as stearic acid are substituted for tetrapropylene benzene or 1-hexadecene in the above examples.

Moreover, similar yields and quality of product are obtainable in the above examples with dilute sulfur trioxide, for example, a sulfur trioxide-air mixture containing about 50% air by volume or a sulfur trioxide-air mixture containing about 95% air by volume.

Moreover, similar results are obtainable if mixtures of two or more organic compounds are substituted for the tetrapropylene benzene in the above examples.

The foregoing description has been presented describing certain operable and preferred embodiments of this invention. Other variations will be apparent to those skilled in the art.

What is claimed is:

1. A process for sulfonating organic compounds selected from a group consisting of alkyl benzenes containing about 12 to 15 carbon atoms and alpha-olefins containing 10 to 18 carbon atoms, said process comprising the steps of:
   (A) introducing said organic compound downwardly into a cylindrical verticallly-oriented reaction zone defined by a supporting and confining heat exchange surface and forming a thin liquid film of said organic compound flowing downwardly on said heat exchange surface along the length of said reaction zone, said flowing film having a thickness ranging from about 0.005 inch to about 0.05 inch at a specific stock rate of organic compound from about 2 to about 75 pounds per hour per inch;
   (B) cocurrently introducing into said reaction zone undilute gaseous sulfur trioxide, said gas being introduced at subatmospheric pressure;
   (C) cocurrently contacting said downwardly flowing liquid film with said gaseous sulfur trioxide to produce substantially complete reaction between said film and said gas, the only turbulence in said film being that produced inherently by said organic compound flow;
   (D) removing at least a portion of the exothermic heat of reaction resulting from the contact of said liquid film with said sulfur trioxide by heat transfer through said heat exchange surface to maintain a reaction temperature ranging from about 110° F. to about 160° F.
   (E) maintaining in said reaction zone a subatmospheric pressure;
   (F) the subatmospheric pressure at which said gaseous sulfur trioxide is introduced and which is maintained in said reaction zone ranging from about 6 mm. Hg to about 60 mm. Hg;

(G) said subatmospheric pressure being caused by drawing a vacuum downstream of said reaction zone, said vacuum causing any excess gas to be withdrawn whereupon the resulting reaction product is recovered.

References Cited

UNITED STATES PATENTS

| | | | |
|---|---|---|---|
| 3,169,142 | 2/1965 | Knaggs et al. | 260—505 |
| 3,232,976 | 2/1966 | Lolr | 260—505 |
| 3,270,038 | 8/1966 | Marshall et al. | 260—505 |
| 2,580,317 | 12/1951 | Pekar et al. | 183—80 |

FOREIGN PATENTS

| | | |
|---|---|---|
| 634,264 | 4/1963 | Belgium. |
| 1,007,994 | 10/1965 | Great Britain. |
| 1,007,995 | 10/1965 | Great Britain. |

LEON ZITVER, Primary Examiner

L. DE CRESCENTE, Assistant Examiner

U.S. Cl. X.R.

260—400, 457, 458, 459, 460, 505, 513